United States Patent Office 2,869,179
Patented Jan. 20, 1959

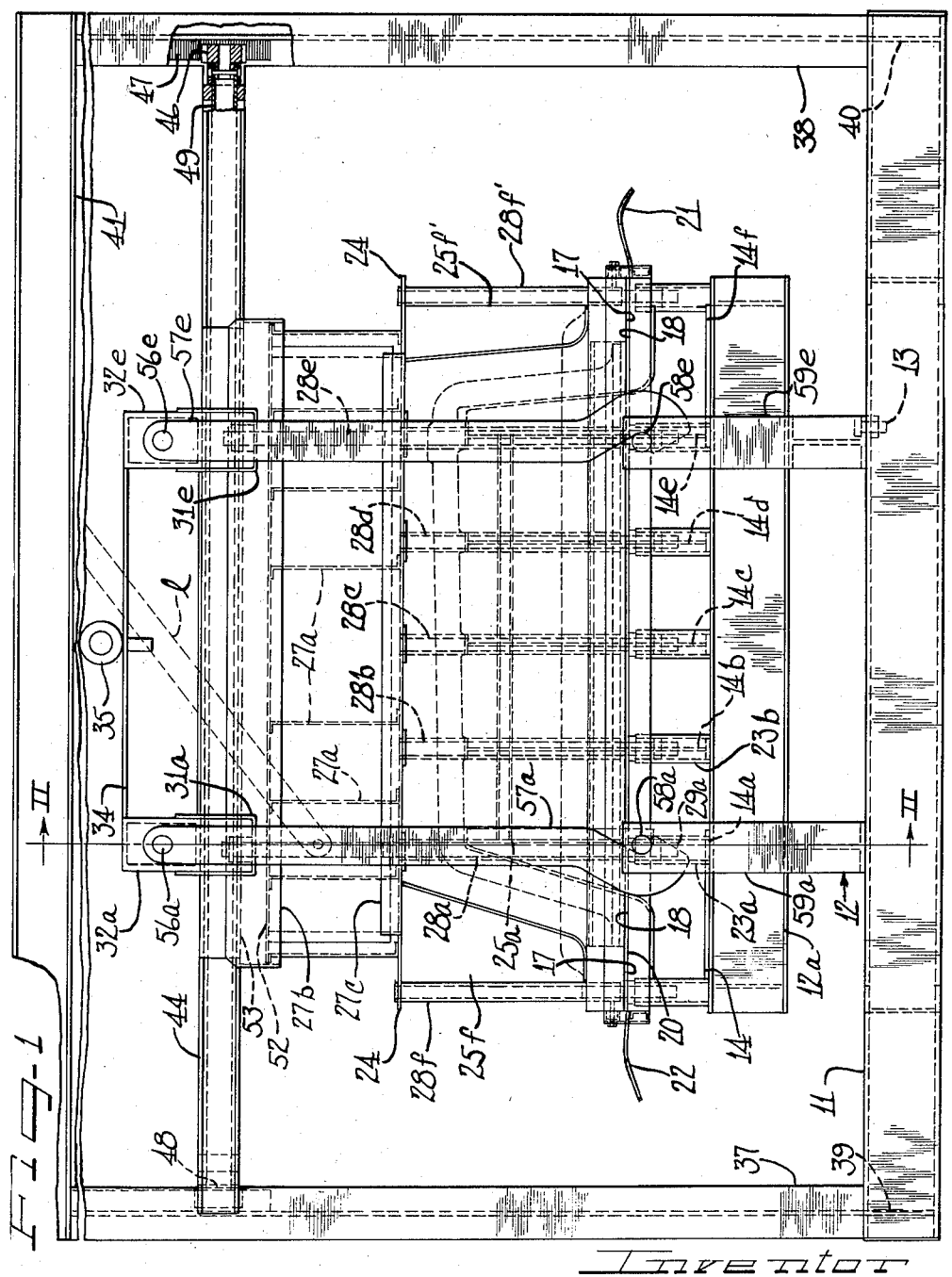

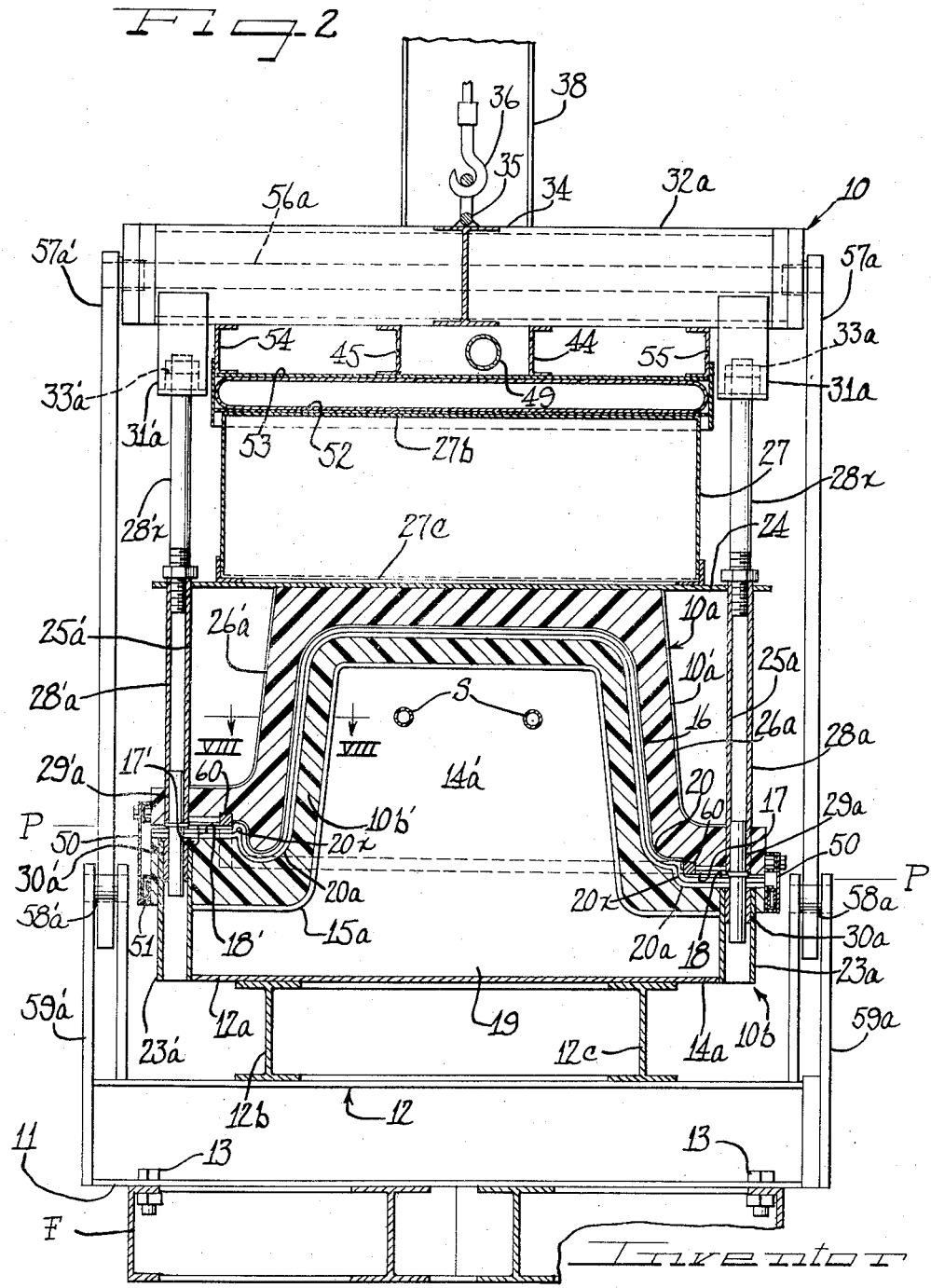

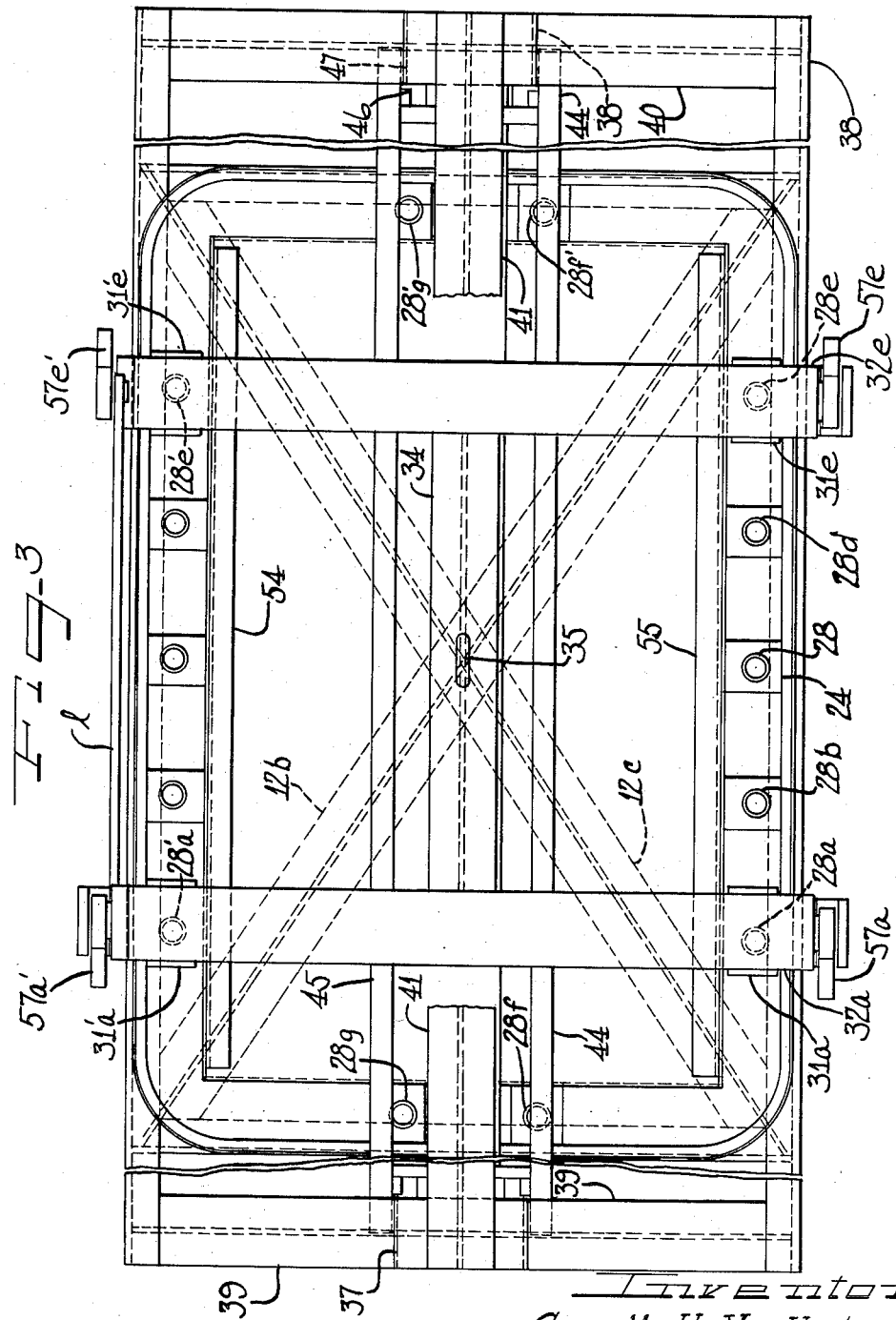

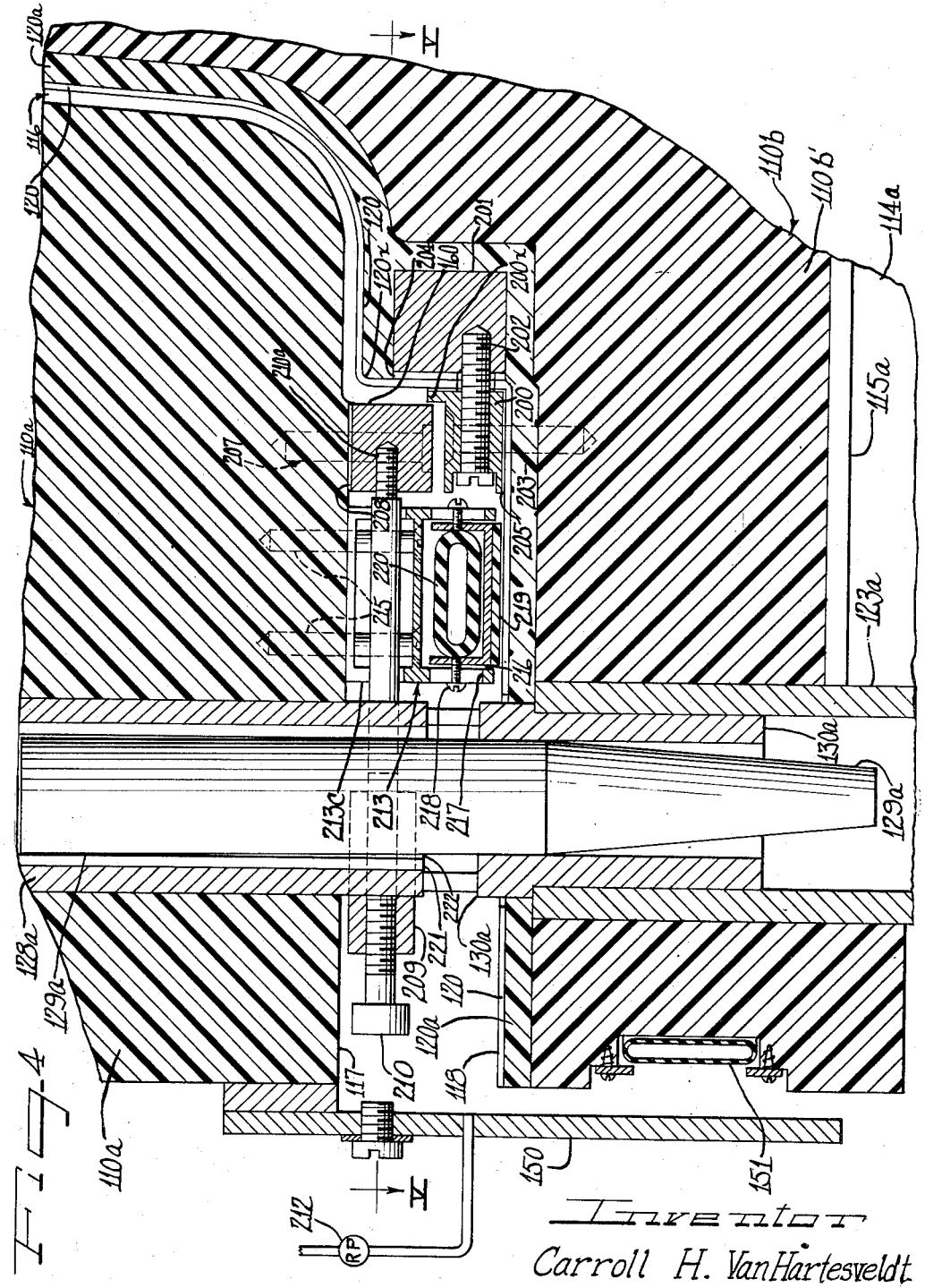

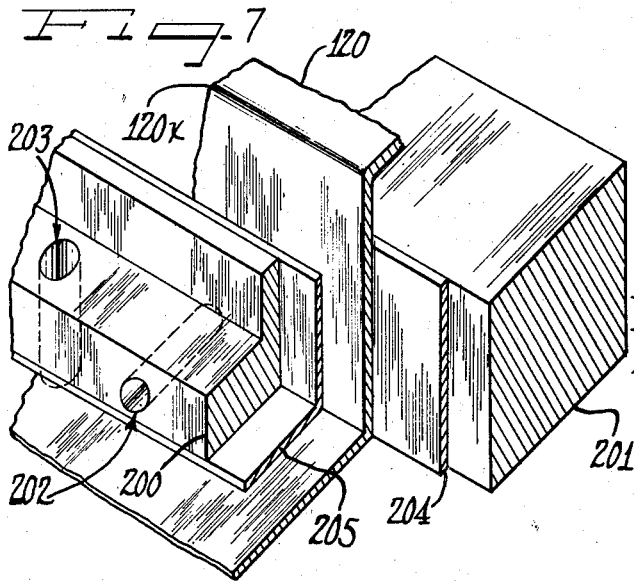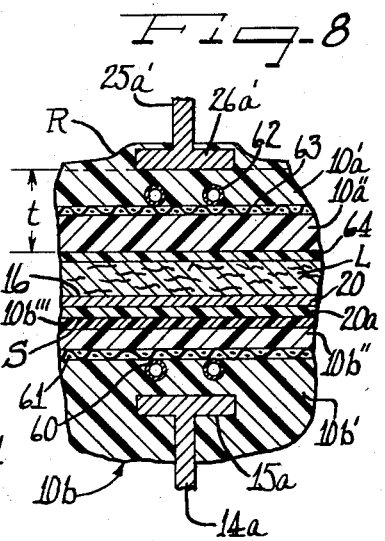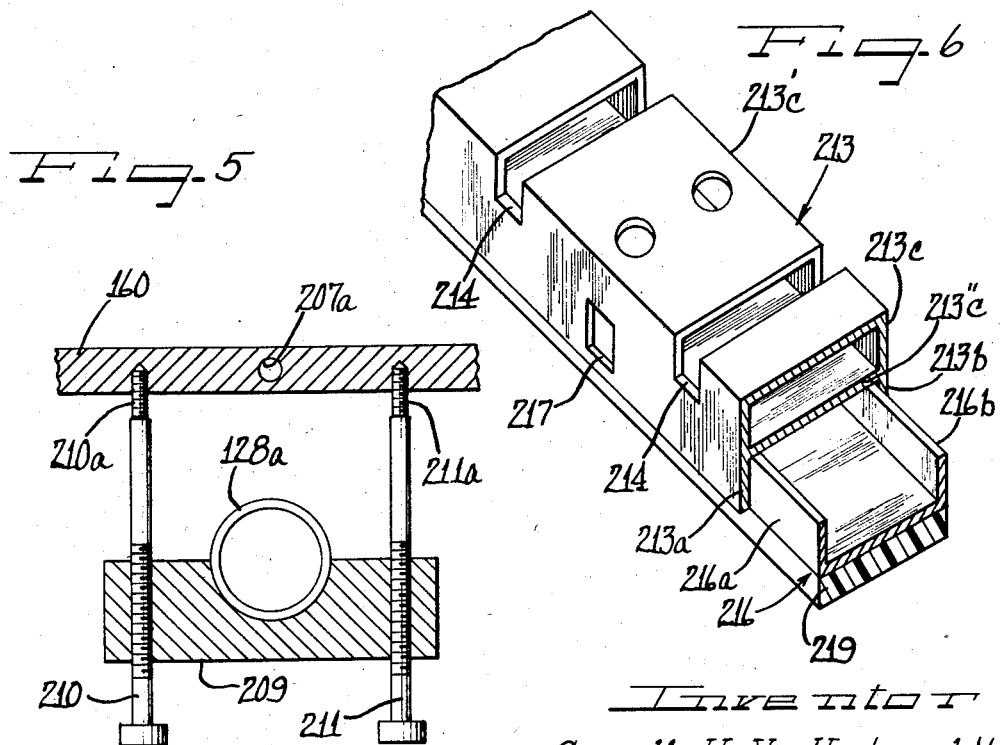

2,869,179

MOLD CONSTRUCTION

Carroll H. Van Hartesveldt, Birmingham, Mich.

Application March 25, 1955, Serial No. 496,809

4 Claims. (Cl. 18—34)

The instant invention relates to molding apparatus and a method of forming the same, and more particularly, to an improved lightweight molding apparatus assembly, and method of making same, adapted for use in the fabrication of glass fiber-polyester resin parts, laminates or the like.

Although the instant molding apparatus and the method of making the same in accordance with the instant invention lend themselves to a number of molding operations, the instant invention is most useful in the field of low pressure laminates and, accordingly, the use thereof will be described primarily in connection with such low pressure laminates, and the molding thereof in large units or sections.

In recent times, there has developed a very great demand for the so-called "glass fiber-polyester resin" laminates, which have unusually superior structural characteristics such as high strength, impact resistance, resilience and relatively light weight. These laminates are employed in the form of relatively small articles as well as comparatively large structural members, such as bathtubs or the like. Heretofore, the most effective production method available for the manufacture of these glass fiber-polyester resin laminates in large structural sections involve the use of steam or water-heated matched metal dies operating in a hydraulic press. As will be appreciated, for the larger laminates, these dies are extremely expensive, requiring a long time to be formed or prepared; and if such dies are inaccurate, they will produce voids and similar flaws in the laminates. The repair and maintenance of such dies also involves very great expense. In the case of smaller molds, plastic or synthetic resin dies have been considered. Such dies may be made of filled phenolic or epoxy resin which is strong enough for this purpose (i. e., low pressure laminating, as the art describes it); and such dies can be cast with a relatively high degree of accuracy, because of the low shrinkage rate for such resins. Such plastic dies would also be relatively inexpensive.

I have found, however, that the techniques ordinarily employed in making small plastic dies are wholly inapplicable if large plastic dies are to be made. The relatively little shrinkage experienced in the casting or hardening of such resins to make small dies become greatly magnified in the manufacture of large dies and the mere formation of such large plastic dies would appear to be substantially impracticable cause of such shrinkage. Moreover, the large masses of hardened plastic material offer a completely new set of problems in temperature control and in dimensional control. Such large masses of hardened plastic material of the type usable in such dies have a very appreciable thermal expansion or contraction, far beyond the dimensional tolerances which are permitted in the manufacture of commercially acceptable laminates. Also, I have found that such hardened plastic materials, although capable of forming a suitable molding cavity surface and capable of withstanding the ordinary low pressure molding forces, have generally such inadequate dimensional stability during a molding cycle that these plastic materials in and of themselves cannot provide the entire die structure.

An initial problem concerning the handling of heat during the molding cycle has been solved to a substantial extent, and the solution to this problem is described and claimed in my copending application Serial No. 496,810 entitled "Mold Temperature Control," filed concurrently herewith, and made a part hereof by reference. In such application, an important feature involves the use of a metal lining for the die cavity mounted on one of the mold members and suitably connected to a source of electricity so as to permit the flow of electricity through the metal lining to provide heat for molding directly at the molding cavity. As will be appreciated, the hardened plastic materials employed in the instant lightweight mold members are not good conductors of heat; and the use of a metal liner avoids the necessity for forcing heat through the hardened plastic bodies in order to reach the molding cavity (and also minimizes the necessity for heating the plastic material to high temperatures during the molding cycle). This arrangement thus permits the use of such lightweight plastic mold members in a large size mold of the type of primary interest in the instant invention and materially simplifies the problem of temperature control in a mold of this type. The instant invention, however, provides a novel structure whereby dimensional stability is imparted to such lightweight mold members during the molding cycle. Also, the instant invention offers a solution to the problem of making mold members of this type so as to obtain the desired initial dimensional accuracy as well as dimensional stability during operation.

It is, therefore, an important object of the instant invention to provide an improved molding apparatus and an improved method for forming the same.

Another important object of the instant invention is to provide an improved reinforcing structure for use with hardened plastic mold members to impart the necessary dimensional stability thereto and to resist degradation of such mold members during the ordinary molding cycle.

A further object of the instant invention is to provide an improved method for forming large size lightweight mold members which cooperate to form a die cavity of dimensional accuracy and dimensional stability during the molding cycle.

Other objects, features and advantages of the instant invention will become apparent to those skilled in the art from the following detailed disclosure thereof and the drawings attached hereto and made a part hereof.

On the drawings:

Figure 1 is a side elevational view of a mold assembly embodying the instant invention;

Figure 2 is a sectional elevational view taken substantially along the line II—II of Figure 1;

Figure 3 is a top plan view of the mold assembly of Figures 1 and 2;

Figure 4 is an enlarged fragmentary detail view in elevation of a modified cutoff bar and guide pin arrangement embodying the instant invention;

Figure 5 is a sectional view taken substantially along the line V—V of Figure 4, but showing only the cutoff bar mounting and adjusting elements in the absence of the other elements;

Figure 6 is a view in perspective of a portion of the modified pneumatic mold separating means and housing therefor as shown in Figure 4;

Figure 7 is a view in perspective showing a section of the cutoff bar arrangement associated with the cavity defining metal sheet in the instant mold assembly shown in Figure 4; and Figure 8 is a detailed fragmentary enlarged sectional view taken substantially along the line VIII—VIII of Figure 2.

A mold assembly, designated generally by the reference numeral 10, comprises an upper movable molding block or member 10a and a lower stationary molding block or member 10b (best shown in Figure 2). The lower member 10b, which is the male mold member, is made up primarily of a rigid electrical insulating lightweight material, such as hardened phenolic or epoxy plastic (which is preferably filled with conducting metal powders so as to be a semi-heat conductor). Although the details of the structures of the members 10a and 10b will be further explained, it should be noted that the female mold member or movable member 10a is also made of a lightweight hardened plastic material of the same type. In molding apparatus of the instant invention, these male and female mold members 10a and 10b cooperate to define a die cavity 16 having rigid molding walls (which will be described) and having the shape of the article to be molded. The article to be molded most conveniently has a generally bowed shape and in the case of the articles of particular interest for the purposes of the instant invention, the article has a generally dished shape, such as in the case of a bathtub, for which the molding assembly 10 shown in the instant drawings has been designed.

As previously mentioned, the hardened plastic materials employed in bodies of the size here involved undergo a substantial amount of shrinkage during formation and also tend to undergo dimensional changes during the heating up and cooling of the mold assembly during the molding cycle. Referring first to the structure of the non-movable male mold member 10b, it will be noted that a suitable steel frame 11 is secured to a permanent foundation member F, as by bolts 13, for rigid assembly and the base frame 11 has centrally mounted thereon a steel table 12 secured thereto by welding. The table 12 has secured thereto (also by welding or other suitable fastening means) a table top 12a which actually mounts the male mold member 10b.

Although the mold structure of the invention may be shaped to accommodate the formation of molded articles of a number of different shapes, the instant mold assembly 10 is adapted for use in the molding of dish-shaped bathtubs having a longer or longitudinal dimension (as indicated in Figure 1 from the side view) and a shorter lateral dimension (as indicated in Figure 2, across the mold assembly) and for the sake of distinguishing between these two dimensions or directions which are substantially at right angles to each other, the phraseology "longitudinal" and "lateral" may be used on occasions hereinafter. It will be understood, however, that parts or elements can be reversed in the instant structure without departing from the inventive concept and so-called "longitudinally" spaced elements may be "laterally" spaced elements or vice versa as the case may be.

Referring again to the male mold member 10b, it will be noted that the male mold member 10b has reinforcing elements 14a, 14b, 14c, etc. each extending across the male mold member 10b (in the lateral direction). The reinforcing element 14a is shown in full view in Figure 2, with the top flange portion 15a also shown in full view. As will be noted, the mold members 10a and 10b cooperate to define a generally dish-shaped cavity 16 and these members 10a and 10b engage or substantially engage along contiguous peripherally disposed rigid face portions 17 and 18, respectively, along substantially a parting line or parting "plane" P—P between the mold members 10a and 10b. As in the case of all separable molding members, a parting plane P—P is here involved; and because of the peculiar shape of the periphery or top of the bathtub which is to be formed ultimately, it will be noted that the contiguous faces 17 and 18 lie only generally in a single plane P—P. These faces 17 and 18 are very close together when the members 10a and 10b are in cavity-defining relationship and may be considered to be in the same plane as far as the various other structural elements here involved are concerned. Also, the parting plane P—P is at a slightly higher level on the left hand side of Figure 2 (where the faces 17 and 18 are designated by 17' and 18') than on the right hand side, merely to conform with the particular shape of the bathtub periphery. The alignment of the various structural elements in the instant device is made, however, paying particular attention to the general plane P—P of the contiguous mold faces 17 and 18, as will be explained hereinafter.

In the case of the lower mold member 10b, the reinforcing element 14a extends laterally the full width of the mold member 10b from beneath the contiguous face portions 17' and 18' on the left hand side to beneath such faces 17 and 18 on the right hand side, as shown in Figure 2; and in the central portion 14a' of the reinforcing element this member extends upwardly having a generally arcuate top contour to conform with the generally arcuate cross-section of the cavity 16. A relatively short flange 15a is mounted along the top edge of the reinforcing element 14a and this flange 15a is anchored in the resin body 10b' of the lower mold member 10b. In actual practice, the resin body 10b' may merely have its back wall anchored by the flange 15a embedded therein, so that the resin body extends upwardly and outwardly from the flange 15a, or the resin body 10'b may include in its cross-section the entire reinforcing element 14a.

As indicated in Figure 1, the male reinforcing elements 14a, 14b and 14c are longitudinally spaced laterally extending reinforcing elements (mounted in such spaced position on longitudinally extending spacers S,S of Figure 2) embedded in the hardened plastic and having a generally flat rear or bottom portion 19 extending across the male mold member 10b. The rear surface of the hardened resin proper 10b' is, of course, anchored by the reinforcing elements 14a, 14b, etc. and the front or molding surface of the mold member 10b itself is covered with a metal cavity lining 20 (also shown in full view in Figure 2) of stainless steel or comparable metal which functions as an electric conductor. As indicated diagrammatically in Figure 1 at 21 and 22, the metal lining 20 for the cavity is connected to electrical leads which provide heat for the cavity when a current is passed through the metal lining 20.

The metal lining 20 is backed by a thin layer of relatively rigid, but resilient material such as silicone rubber, indicated by the reference numeral 20a and shown in full view for the sake of simplifying the drawing in Figure 2. The resilient backing 20a affords electrical and heat insulation between the metal lining 20 and the hardened plastic 10b' and the other structure and it also has sufficient resilience to permit thermal expansion to take place independently between the metal lining 20 and the plastic body 10b'.

In addition, a plurality of hollow posts 23 are provided along opposite sides (as indicated at 23a and 23a' for the member 14a of Figure 2) of the mold member 10b in alignment with the outer edges of each of the reinforcing members 14a, 14b, etc. and secured thereto, as by welds or the like. These hollow posts 23 of steel or similar structural material extend upwardly to substantially the face portion 18 at the parting plane P and are secured to the metal lining 20 (through an insulated connection) to complete the "metal" structural arrangement of the lower mold member 10b. This structural arrangement provides a hardened resin bulk 10b' for resisting generally the forces to be applied to the mold member 10b, plus a metal structure in the form of the reinforcement 14a, the hollow posts 23a, 23a' and the metal lining 20 which is dimensionally stable during changes in temperature of the mold member 10b.

Referring now to the top or movable mold member 10a in Figure 2, it will be noted first that a central backing plate 24 covering substantially the entire lateral and longitudinal dimension of the mold member 10a is provided. The backing member 24 mounts on the bottom thereof the generally dish-shaped resin body 10a' which forms the bulk of the female mold member 10a. The metal backing sheet or member 24 has a plurality of longitudinally spaced reinforcing elements, the first pair 25a and 25a' of which are shown in Figure 2, affixed to the sheet 24 as by welding, and extending downwardly in the direction of the face portion 17 extending around the lower periphery of the movable mold member 10a. The elements 25a, 25a' (Figure 2) are a pair of ear-like members extending downwardly on either side of the mold member 10a from the backing plate 24 and presenting flange portions 26a', and 26a (shown in full view) on the inside thereof which are embedded in and anchor the resin body 10a' in substantially the manner in which the flange portion 15a anchors the resin body 10b' in the lower mold member 10b. These reinforcing elements 25a, 25a combine with the backing member 24 to provide a plurality of generally U-shaped reinforcing members, which are aligned with the male elements 14a, 14b, etc. and are longitudinally spaced, as indicated in Figure 1.

An extremely strong compression-resistant supporting element 27 is positioned on top of the backing member 24 for the purpose of resisting bending of the member 24. In the interest of obtaining a lightweight construction, however, the supporting element 27 is made up of suitable steel structural elements (shown in Figure 1) which comprise a number of vertically extending braces 27a interposed between two horizontal wall members 27b and 27c. As will be explained, the support 27 transmits downwardly directed molding forces, as well as resisting any bending of the backing member 24. Notwithstanding the structural arrangement provided by the support 27 and the backing member 24, there is a tendency for the generally U-shaped supporting or reinforcing elements (i. e., the combination of 25a, 24 and 25a' as shown in Figure 2) to bow outwardly in response to outward lateral forces.

For this reason, means which will be described are provided for securing the lower extremities of the members 25a, 25'a to the male reinforcing member 14a at the lateral extremities thereof (23a and 23'a). This arrangement thus effectively locks the position of the legs 25a, 25a' of the U-shaped female reinforcing members. As indicated in Figure 2, the outer edges of the depending reinforcing elements 25a, 25a' have secured thereto posts 28a and 28a' as by welds or similar fastening means, and the posts 28a and 28a' are also secured to the backing member 24 so as to prevent lateral movement thereof in the plane of the backing member 24. The posts 28a and 28a' each carry guide pins 29a and 29a' firmly secured thereto, which guide pins extend past the bottom of the posts 28a and 28a' at the face portions 17 and 17' and beyond the contiguous face portions 18 and 18', whereat the pins 29a and 29a' are received respectively at their depending tapered ends and held by guide pin sleeves 30a and 30a' firmly mounted in the hollow posts 23a and 23a', which are in turn secured to the male reinforcing element 14a at the opposite lateral extremities thereof. The locking engagement between the guide pins 29a and 29a' and sleeves 30a and 30a' thus completes the reinforcing assembly "14a and 25a" (plus 24 and 25a') so as to secure the positions of the leg portions (25a and 25a') of the U-shaped female reinforcing members.

Referring briefly to Figures 1 and 3, it will be noted that the mold assembly 10 is not only provided with longitudinally spaced reinforcing assemblies 14a and 25a, 14b and 25b, etc., but is also provided with a pair of laterally spaced reinforcing assemblies indicated at opposite ends of the assembly 10 in Figure 1 as 14f and 25f (and 25f'). The location of the supporting elements thus aligned may be seen in Figure 3 by reference to the guide pin posts therefor 28f and 28f', and 28g and 28g'. It will be seen that these reinforcing members extend longitudinally of the mold 10 and are spaced laterally, but their function is the same as that of the other assemblies 14a and 25a, 14b and 25b, etc.

As will be noticed, most of the guide posts 28 extend only up to the level of the supporting sheet 24, but the guide posts 28a, 28a', 28e and 28e' extend upwardly beyond the reinforcing or backing sheet 24 (or as shown in Figure 2) have upwardly extending sections 28x, 28x', etc.) which are slidably received in depending hangers 31a, 31a', etc. which in turn are firmly mounted at opposite ends of laterally extending box-beam support members 32a and 32e. The hangers 31a, etc. slidably receive the respective upper extremities of the guide posts 28a so as to permit limited upward movement of the guide post 28a in the hanger 31a, and downward movement of the guide post 28a is limited by a lock nut 33a, so that in lifting movement of the hangers 31a, etc. such hangers will serve to carry the entire weight of the upper mold assembly 10a.

The cross beams or laterally extending supports 32a and 32e are firmly secured together (as by welding) by a longitudinally extending beam 34 (Figures 1 and 3) which has a centrally mounted loop 35 connected to overhead hoist means (not shown) as by a hook and chain assembly 36, whereby the entire upper mold assembly 10a may be raised or lowered and the cavity is selectively opened or closed. As will be explained hereinafter, the hook and chain assembly 36 need only be strong enough to accomplish actual lifting of the weight of the mold assembly 10a and the parts associated therewith, since the molding pressure is not to be applied through such lifting device nor is the lifting device to be used to any appreciable extent for separating the mold members 10a and 10b at the end of the mold cycle. The use of relatively lightweight hoist equipment in the instant device is, of course, of very great advantage industrially and the instant moulding member 10a is a lightweight molding member which permits this advantage.

An important feature of the lightweight mold and light duty hoist arrangement in the instant invention involves additional guide means which will be described. As will be noted in Figures 2 and 3, the base plate 12a is supported on the bottom framework by a pair of intersecting I-beams 12b and 12c (which are shown best in Figure 3 extending from the opposite corners beneath the mold assembly 10). At one end of the base structure 11 there are mounted, near the center, an upright I-beam 37 and at the opposite end is mounted a corresponding upright beam 38. The bottom of the supporting framework comprises end cross beams 39 (supporting the bottom of the upright 37) and 40 (supporting the bottom of the upright 38). The uprights 37 and 38 are firmly secured at their tops to a centrally positioned longitudinally aligned top I-beam 41 (shown substantially completely in Figure 1 and only at the ends thereof in Figure 3). As is indicated in Figure 1 the central longitudinal I-beam 41 is positioned a substantial distance above the hook 35 and mounts the hoist apparatus (not shown) which is connected directly to the hook assembly 36 for raising and lowering of the top mold member 10a.

Guide means for assisting in raising and lowering the top mold assembly 10a are provided in the form of upwardly extending longitudinally opposed beams 37 and 38 (centrally located at each end). The main cross beams 32a and 32e in the movable mold assembly 10a have firmly secured to the underside thereof (as by welds) a pair of spaced longitudinally extending channel irons 44 and 45 which extend the full length of the framework and over to close running relation on either side of the upright guide beam 37 at one end and to close running relation on either side of the guide beam 38 at the other end, so as to substantially prevent tilting of the upper mold member 10a about the longitudinal axis thereof.

It will also be noted that followup means (Figure 1) are provided for the spaced longitudinally extending channel irons 44 and 45 in the form of a suitably rotatable gear member or pinion 46 carried by the channel irons 44 and 45 and meshing with a rack or suitable set of teeth 47 mounted on a vertically aligned surface of the centrally positioned upright guide beam 38. It will be appreciated that the rack and pinion arrangement described is also used in connection with the central upright guide beam 37 at the opposite end, generally indicated at 48 in Figure 1 and the rotatable pinions are tied together on a common shaft (the location of which is shown at 49 in Figure 2 and in Figure 1). In this manner, the tilting of the top mold assembly 10a about a laterally extending axis is also prevented and the pinions rotate at a uniform rate of speed during raising and lowering of the assembly 10a.

As previously mentioned, the hangers 31a and 31a' (of Figure 2) and their counterparts associated with the cross beam 32e of Figure 1 serve to carry the weight of the mold assembly 10a during raising and lowering thereof, until the mold assembly 10a has been lowered to substantially closed position. In such case, the slidable movement of the guide pin posts 28a, 28a', etc. in the hangers 31a and 31a', etc. permits the hangers 31a, etc. to move downwardly slightly below the lock nuts 33a, etc. and the weight of the mold assembly 10a is carried by the mold assembly 10b. This is all the pressure that is applied to the laminate during the initial molding operation; and at this time the mold assembly 10 is in substantially closed position, as shown in Figure 2. In such substantially closed position, it may be advisable to evacuate the mold cavity and this is done by means of the peripheral baffle 50 which passes through the plane P—P' and extends around the entire periphery of the mold body, and an expandible rubber hose 51 which cooperates with the baffle 50 (when subjected to fluid pressure) so as to effectively seal the entire mold cavity. The cavity may then be evacuated by pump means (not shown) and the laminate therein is thus ready for the final molding step which involves the application of pressure.

In the instant device, pressure is applied to the mold by means of a fluid pressure responsive diaphragm or resilient bag member 52 which is mounted on the top side 27b of the compression resistant backing member 27 and beneath a rigid platen 53 which is firmly secured to the bottom of the channel irons 44 and 45 centrally positioned and laterally mounted channel irons 54 and 55 (Figure 2). It will be appreciated, however, that the mere application of hydraulic or fluid pressure to the diaphragm means 52 without further modification or alteration in the structure would serve only to lift the channel irons 44 and 45, 54 and 55 and associated platen 53, and little or no pressure would be applied to the mold cavity. To obtain the benefit of the fluid pressure in the resilient diaphragm member 52, a step is carried out prior to the application of pressure to the diaphragm member 52 and after the mold assembly is in substantially closed position. This step involves the locking of the mold members 10a and 10b together so as to prevent opening movement therebetween. The main cross beams or box beams 32a and 32e each carry a shaft 56a and 56e which is rotatably mounted in each and it will be seen that the shaft 56a (Figure 2) has a depending hook member 57a corotatably secured to an outwardly extending end thereof on one side and a depending hook member 57a' corotatably mounted to the opposite end thereof. In closed position, the depending hook members 57a and 57a' may be swung down so as to engage cross pins 58a and 58a', respectively, which are securely mounted in rigid bifurcated members 59a and 59a', in turn, secured to the supporting framework 12. As indicated in Figure 1, corresponding hook members 57e and 57e' are mounted in a similar manner and may be swung into locking engagement with corresponding cross pins 58e, 58e'. Once the hook members 57a, etc. are moved into locking engagement with the corresponding pins 58a, the application of fluid pressure to the diaphragm means 52 will result only in a downwardly directed compressive force in the mold cavity, because lifting of the top portion of the carrier assembly will be prevented by the locking engagement of the hooks 57a, etc. It will be noted that a linking bar "1" (shown only partially in Figure 1) connects the two sets of hooks 57a, 57a' and 57e, 57e' so that all will move together.

When the molding cycle is completed, the pressure is released in the diaphragm 52, the hooks 57a, etc. are unhooked; and the members 10a and 10b are separated by pressure applied between the faces 17 and 18 either by reversing the evacuating action previously employed to evacuate the cavity or by other means to be described.

Referring now to Figures 4, 5, 6 and 7, which show certain particularly important structural arrangements in connection with the guide pin assemblies and cutoff bars, it will be noted that elements in these views which are substantially the same in function as those previously described will have a reference numeral that is 100 plus the reference numeral hereinbefore employed. Thus, in Figure 4, the movable top mold member is 110a instead of 10a, etc.

First of all, it will be noted that an improvement is provided in the cutoff arrangement shown in Figure 4 by virtue of the use of a lower cutoff bar 200 to avoid the necessity for actually putting a sharp edge on the skin or metal sheet 120 at the region of 120x shown in Figure 4. In contrast, it will be noted that peripherally aligned cutoff bars 60 in Figure 2 are carried by the top mold member 10a and cooperate with relatively sharp edges 20x in the metal skin 20 so as to provide a line whereat the cavity is almost closed (leaving a spacing of a few thousandths of an inch) to prevent excessive loss of resin before completion of the polymerization during molding. The sharp edge 20x which must be applied in order to make the cutoff function effective cannot be applied easily to stainless steel or similar metals and usually involves building up a weld and subsequent machining at the location 20x.

In contrast, in Figure 4, only a generally rounded portion 120x is provided in the skin 120 and a very sharp cutoff bar edge is provided at 200x in the auxiliary cutoff bar 200. The cutoff bar 200 must, however, be rigidly and firmly secured to the skin 120 and yet insulated therefrom. In fact, the cutoff bar 200 must be mounted so that its position is fixed during the entire molding cycle, and this is accomplished by securing the cutoff bar 200 to an enlarged reinforcing bar 201, by means of bolts as at 202, so that the cutoff bar 200 will be securely fixed in position. Also, bolts, as at 203 may be used to secure the cutoff bar 200 to the body or bulk of the resin of the lower mold assembly 110b, but the connection with the metal skin 120 and reinforcing bar 201 more effectively fixes the position of cutoff member 200. The manner in which the cutoff 200 is insulated from the skin 120 is best shown in Figure 7, where it will be noted that the reinforcing member or bar 201 is spaced from the metal skin 120 by means of a flat sheet of insulator 204 and the side and bottom edges of the auxiliary cutoff bar 200 are insulated from the metal skin by means of the thin insulator sheet 205. As shown in Figure 4, the bolt 202 which clampingly engages the auxiliary cutoff member 200 and holds the same in position is actually spaced from the skin 120 when it passes through an aperture in the skin 120. This assembly for the auxiliary cutoff bar 200 serves to fix the position of the same permanently during the molding operation and there is substantially no change in the position thereof as a result of expanding or contracting forces brought about by heating and cooling of the resin body in the mold member 110b. Also, it will be noted that the skin 120 is spaced from the guide pin receiving sleeve 130a and is mounted upon the silicone rubber backing member 120a so as to effectively insulate the metal skin 120 from the other elements of the mold 110b.

The upper cutoff bar 160 of Figure 4, like the auxiliary cutoff bar 200, extends around the entire periphery of the mold assembly and is adapted to operate in extremely close running relation with the sharp edge 200x of the auxiliary cutoff member 200. The upper cutoff bar 160 is secured to the resin body of the upper mold member 110a by means of screws as at 207 (and also preferably insulated from the resin body 110b by a thin insulator sheet 208); but the tendency for the resin body of the member 110a to respond to temperature changes is so great that it has been found that the mounting of the cutoff bar solely on the resin body promotes a very substantial number of molding problems. In accordance with the instant invention, the cutoff bar 160 is carried by the mold member 110 but is rigidly connected to a reinforcing element thereof, in this case the guide pin post 128a, so as to assure close running relation with the other mold member 110b, and particularly the cutoff point 200x mounted on the other mold member 110a.

As will be seen best in Figure 5, in top plan view, the cutoff bar 160 is more or less loosely secured to the upper mold member 110a as by bolts 207 passing through apertures 207a, so that limited relative movement between the resin body of the mold member 110a and the cutoff bar 160 will be permitted. A yoke member 209 is secured to the guide pin post 128a and a pair of set screws 210 and 211 pass through suitably threaded apertures in the yoke 209 and present forward terminal portions 210a and 211a which engage corresponding apertures in the back of the cutoff bar 160. Preferably, the terminal portions 210a and 211a threadedly engage apertures in the back of the cutoff bar 160 (with the threads in the end portions being reversed to the threads in the yoke 209) and turning the set screws 210 and 211 may be used to absolutely fix the spacing between the guide pin post 128a and the cutoff bar 160. In this manner, the cutoff bar is rigidly affixed to the guide post 128a (and the same assembly is employed for each of the guide posts around the entire periphery of the mold) so that the cutoff bar will be definitely fixed in its position for the molding cycle.

Still another feature of importance in the practice of the instant invention involves an improved arrangement for the application of high pressures between the contiguous faces 117 and 118 in order to open the mold at the end of the molding cycle. As previously mentioned, the baffle 150 and pneumatic means 151 may be used to seal off the entire cavity 116 and evacuation thereof may be accomplished by means of a suitable pump indicated diagrammatically at 212. Also, when the molding cycle has been completed, the reversible pump 212 may be used to increase the pressure between the contiguous faces 117 and 118 substantially above atmospheric pressure (while the pneumatic means 151 still serves as a seal) and a lifting force is applied sufficient to open the mold. On the other hand, in certain instances, it is not necessary to evacuate the cavity 116 and in other instances, it may be desirable to apply substantially greater lifting pressures between the faces 117 and 118 than can be applied by the reversible pump 212 in view of the sealing means 151. In such instances it has been found that a pressure expandible or fluid pressure responsive hose or diaphragm means which is positioned around the entire periphery of the cavity 116 and closely adjacent to the guide pin posts 128a, etc. may be used to effectively open the mold. In the instant arrangement which has been found to be unusually advantageous and durable during mold operation, a generally inverted U-shaped channel assembly, shown in Figures 4 and 6, designated 213 is mounted on the top mold member 110a and extends around the mold periphery just inside the guide posts 128a, etc. As will be seen, the depending portions 213a and 213b of the U-shaped member 213 are mounted on a hollow rectangularly cross-sectioned back portion 213c. The back portion 213c has laterally extending slots cut therein as at 214, 214 and, as indicated in Figure 4, these laterally extending slots 214, 214 receive the set screws 210, 211, etc. At intervals, the top wall portion 213c' and the bottom wall portion 213c'' of the box-like back member 213c are apertured so as to receive suitable screws or bolts 215 which are employed to secure the channel member 213 to the face 117 of the upper mold member 110a.

A second U-shaped channel member 216 is slidably received in close running relationship between the depending wall portions 213a and 213b of the channel member 213 for limited (telescopic) vertical movement. The extent of vertical movement is limited by the limits of apertures 217 in the side walls 213a and 213b which cooperate with stop screws 218 which are secured to the upturned walls 216a and 216b of the bottom channel member 216.

A suitable heat-resistant insulator, such as silicone rubber or the like, is secured in the form of a flat sheet 219 to the back of the bottom channel member 216 so as to insulate the same from the skin 120 and to withstand the high temperatures of the skin 120 during operation. In between the legs of the channel members 213 and 216 there is positioned a suitable high pressure hose which is connected to a source of fluid under pressure (not shown). When the mold assembly is closed the insulating layer 219 may come to rest against the skin 120. In view of the various apertures in the channel members 213 and 216, the resting of the insulator member 219 on the skin 120 will not effectively seal off the mold along the line of contact and the sealing means 150—151 may be effectively used in conjunction with the pump 212 to draw a vacuum within the cavity 116, if such is desired. After the molding cycle is complete, however, fluid pressure may be applied to the expandible member 220 and this results in the creation of very substantial lifting forces tending to separate the channel members 213 and 216. Only a very slight amount of movement between the mold members 110a and 110b is required in order to effect the initial separation, after which separation of the mold members becomes very easy.

Another aspect of the instant invention involves the problem of forming molds from large bodies of resin such as the epoxy and phenolic resins, in view of the tendency for such resins to shrink appreciably during curing or hardening. The difficulties encountered in attempting to predict the exact amount of shrinkage in a given casting operation are very great. In the formation of the main resin bodies in both the upper and lower members 110a and 110b rather substantial bodies of resin (preferably epoxy resin) are used and there is noticeable shrinkage in the casting thereof. In the casting of the lower mold member 110b, it will be appreciated that a rather elaborate and strong reinforcing structure is provided so that this problem is not so great in the formation of the lower mold member 110b.

Referring briefly to Figure 8, which is a fragmentary sectional view taken from Figure 2, it will be noted that the resin body 10b' for the lower member 10b envelopes the flange 15a on the reinforcing member 14a and is secured thereto. Temperature control means (shown only at Figure 8) in the form of spaced cooling coils 60 secured to a screen 61 are also embedded in the resin body 10b' (although the portion of the resin body 10b'' and 10b''' above the screen 60 is preferably made of aluminum-filled epoxy resin in order to improve the thermal conductivity of this portion of the resin body). The metal skin 20 has a silicone rubber backing 20a which fits against the bulk of the resin body 10b' (10b'' and 10b'''). In forming the bottom mold member 10b, the metal skin 20 is first hammered to exactly the shape desired. The resin members backing the metal skin 20 are preferably made of a "double casting" process which involves casting first the resin body (10b' and 10b") surrounding the flange 15a and extending close to but spaced (about ¼ inch) from the surface s of silicone rubber backing 20a. This casting may be made at reasonable tolerances and with reasonable accuracy. The skin 20 plus the elastomer 20a vulcanized thereto and the resin body 10b may be assembled in the final step by casting the thin layer 10b''' of resin (preferably of the same composition as 10b'') between the elastomer backing 20a of the skin 20 and the resin body 10b' (and 10b''). It will be appreciated that the plural casting operation could involve a series of castings, for example, whereby the initial casting involves the formation of the resin body 10b' using the screen 61, for example, as the outer surface, followed by a subsequent casting of the aluminum-filled epoxy resin layer 10b'', then followed by the casting of the layer 10b''' so as to obtain adherence to the back of the elastomer 20a. The net result is that the casting of a final thin layer 10b''' of resin does not involve appreciable dimensional changes in this thin layer being cast and dimensional accuracy is maintained without imparting undue strains to the metal skin 20.

It will be noted that the laminate to be molded L is shown in Figure 8 as filling the cavity 16.

The top mold member 10a involves additional fabrication problems, because a metal skin is not provided at the cavity face to give greater assurance of dimensional stability and the reinforcing members are generally weaker, because they are in substantially an arcuate shape. A "plural" casting procedure is used in the fabrication of the upper mold member to greater advantage, accordingly. In the fabrication of the upper mold member 10a, a form (not shown) is first provided with a convex surface having precisely the shape desired of the concave cavity face of the upper mold member 10a and a layer of approximately one-quarter of an inch of fugitive material such as wax is applied to this form surface and the bulk of the resin body 10a' is then cast thereagainst. This results in the formation of a resin body having approximately the thickness "t" indicated in Figure 8. This resin body 10a' also is provided with temperature control means in the form of cooling coils 62 secured to a screen 63 all of which are embedded in the resin body 10a'; and the resin body 10a'' on the cavity side of the screen 63 is also preferably aluminum-filled resin for better thermal conductivity. In fact, the entire resin body 10a' and 10a'') may be cast of such aluminum-filled resin. This initial casting of course involves appreciable shrinkage and dimensional distortion (particularly because of the concavo-convex overall shape of the resin body) and the resin body 10a' resulting therefrom has only approximately the desired shape. A final casting step is then employed in order to obtain a thin resin layer 64 at the cavity face of the mold member 10a which has precisely the contour desired in the cavity face. This is accomplished by removing the fugitive wax or other material from the surface of the form previously mentioned and casting the thin resin layer 64 between the form and the previously cast resin body 10a'. The resin used in the resin layer 64 is also preferably an epoxy resin with a substantial quantity of metal filler therein in order to provide thermal conductivity and resistance to thermal deterioration. By this procedure, it is possible to cast a resin body of substantial mass so as to have an accurately defined cavity face thereon.

In general, this aspect of the instant invention involves a method of forming a large size lightweight mold 10a for a die cavity of given shape from a plastic material, such as epoxy resin, which undergoes volume changes during hardening and during heating and cooling subsequent to hardening, which comprises hardening a mass of such plastic of approximately the size of the mold member for the mold 10a and having a surface of approximately the contour of a molding wall or face for the die cavity, and then applying and hardening a thin film of the plastic between the surface and an accurate form for the die cavity.

Another aspect of the instant invention involves the adherence of rigid reinforcing members to the resin body 10a'. As will be appreciated, the concave-convex shape of the resin body 10a' is conducive to substantial dimensional distortion during casting and even the most rigid reinforcing members embedded in the resin body 10a' during such casting would either be distorted or cause unnecessarily great strains in the resin body 10a'. In fact, as a matter of practice, it has been found that casting of bodies of this size cannot be successfully accomplished with the rigid reinforcing members embedded therein originally, if such members are to be used as molds in the manner herein described. Instead, the reinforcing member, such as the ear-shaped member 25a' is positioned with its flange 26a' flush against the backside of the originally cast resin body 10a' (and it will be noted that the original resin body 10a' was cast to approximately the size required to position the same flush against the flange 26a' when the flange 26a' is properly mounted in the mold assembly 10a). The next step involves the application of a layer of resin R which covers the flange 26a' and merges with the remainder of the resin body 10a' so that, after curing of the resin layer R, the flange 26a' is, in fact, embedded in the resin body 10a' and effectively reinforces the same. In this manner, the rigid reinforcing members are actually embedded in the resin body 10a' without the creation of excessive strains within the resin body 10a' or distortion of the rigid reinforcing member 25a' or 26a'.

Another feature of the instant invention involves the positioning of accurately aligned guide means for connecting the mold members 10a and 10b in a precise manner for molding. This feature is best brought out in Figure 4, and it will be appreciated that the molding of the lower mold member 110b (like the lower mold member 10b) does not involve as much dimensional distortion in view of the general shape of the resin mass 110b' as well as the general shape of the reinforcing plates 114a and reinforcing flanges 115a. Also, the guide pin posts 123a and the sleeves 130a mounted therein can be positioned accurately because they are secured to opposite ends of the rigid reinforcing means 114a. The mounting of the guide pin 129a is, however, not as easily fixed. First of all, the guide pin posts 128a are mounted (as indicated in Figure 2) at the legs of U-shaped reinforcing members which do not have the structural strength and which cannot as a practical matter be mounted with sufficient accuracy to assure that the guide pin 129a will be in precisely the position desired for accurate reception by the sleeve 130a. Elaborate measuring and machining operations could possibly correct this, but such would not be practical in the present arrangement; and the inherent reduction in dimensional stability brought about by the mass of resin 110a' in the upper mold member 110a is always a problem. Accordingly, when the resin mass 110a is first cast, it is generally preferable to leave enlarged holes to receive the guide pin posts 128a, etc. Such posts may be subsequently mounted in the resin body 110a' by a second casting operation comparable to the operation involved in mounting the reinforcing flange members 26a, described in connection with Figure 8. On the other hand, the guide pin posts 128a may be cast into the resin body 110a' during the initial formation thereof. In such case, which is the case indicated in Figure 4, the guide pin posts 128a are made appreciably greater in inside diameter than the guide pins 129a; so that the guide pins 129a may be subsequently mounted within the guide pin posts 128a for accurate alignment with the receiving sleeve 130a. As shown in Figure 4, the guide pin posts 128a are very definitely oversized and a sleeve 221 is mounted within the guide pin posts 128a to closely surround the upper portion of the guide pin 129a, but providing some relative movement therebetween. The mold members 110a and 110b are then assembled in position with the guide pins 129a properly positioned in the sleeve 130a and casting epoxy resin is poured down into the posts 128a so as to fill in the space between the posts 128a (and the sleeve 221) and the top of the guide pins 129a, as indicated at 222. The resin is cast in this space 222 in the form of an extremely thin sheet of resin which has substantially the same dimensional stability as the metal posts 128a (and sleeve 221) and this film of resin in the space 222 mounts the guide pins 129a in precisely the position desired for accurate mating engagement with the sleeve or bushing 130a. In this manner, the guide means (in this case the guide pin 129a) is connected to the mold member by applying and hardening a thin layer of plastic between the guide means and the mold member, whereby the guide means is maintained accurately in position for proper alignment during successive openings and closings of the mold.

It will be understood that modifications and variations may be effected without departing from the scope of the novel concepts of the present invention.

I claim as my invention:

1. Molding apparatus for forming a generally bowed article comprising male and female mold members of lightweight hardened plastic cooperating to define a die cavity having rigid molding walls and having the shape of said article, said members engaging along contiguous peripherally disposed rigid face portions, female reinforcing elements embedded in the female mold member and having a generally arcuate shape conforming with the contour of the die cavity, male reinforcing elements embedded in and extending across the male mold member to be aligned with opposed female reinforcing elements at said contiguous face portions, guide pins mounted on one of said members and secured to the reinforcing elements thereof at said contiguous face portions, guide pin sleeves receiving said guide pins and mounted in the other of said members and secured to the reinforcing elements thereof at said contiguous face portions, whereby opposed reinforcing elements are interconnected for mutual support, a cut-off bar carried by one of said mold members and rigidly connected to the reinforcing elements thereof, and a metal cavity lining carried by the other of said mold members rigidly connected to the reinforcing elements thereof and presenting an edge for close running relation to said cut-off bar to sharply define cavity molding wall limits adjacent said face portions.

2. Molding apparatus for forming a generally bowed article comprising male and female mold members of lightweight hardened plastic cooperating to define a die cavity having rigid molding walls and having the shape of said article, said members engaging along contiguous peripherally disposed rigid face portions lying generally in a parting plane between the mold members, female reinforcing elements embedded in the female mold member and having a generally arcuate shape conforming with the contour of the die cavity, male reinforcing elements embedded in and extending across the male mold member to be aligned with opposed female reinforcing elements at said contiguous face portions, guide pins mounted on one of said members and secured to the reinforcing elements thereof at said contiguous face portions, guide pin sleeves receiving said guide pins and mounted in the other of said members and secured to the reinforcing elements thereof at said contiguous face portions, means for selectively moving said members in and out of cavity defining relationship, and guides for maintaining said face portions substantially parallel during such movement of the members in and out of cavity defining relationship, thereby insuring accurate alignment of said pins and sleeves during such movement.

3. Molding apparatus for forming a generally dish-shaped article having a longitudinal and a lateral dimension comprising male and female mold members of lightweight hardened plastic cooperating to define a die cavity having rigid molding walls and having the shape of said article, said members engaging along contiguous peripherally disposed rigid face portions, said female mold member being reinforced by a metal backing member having a plurality of spaced elements affixed thereto and extending toward said face portions along the sides of the female mold member, posts firmly secured to said side elements, guide pins carried by each of said posts and extending through the plane of said face portions, said male mold member being reinforced by laterally extending longitudinally spaced sheet-like metal elements extending from the rear of the mold member to close to the molding walls thereof, and guide pin receiving sleeves firmly secured to said male reinforcing elements.

4. Molding apparatus for forming a generally dish-shaped article having a longitudinal and a lateral dimension comprising male and female mold members of lightweight hardened plastic cooperating to define a die cavity having rigid molding walls and having the shape of said article, said members engaging along contiguous peripherally disposed rigid face portions, said female mold member being reinforced by a metal backing member having a plurality of spaced elements affixed thereto and extending toward said face portions along the sides of the female mold member, posts firmly secured to said side elements, guide pins carried by each of said posts and extending through the plane of said face portions, said male mold member being reinforced by laterally extending longitudinally spaced sheet-like metal elements extending from the rear of the mold member to close to the molding walls thereof, guide pin receiving sleeves firmly secured to said male reinforcing elements, and a metal cavity liner on said male mold member firmly secured to the guide pin receiving sleeves and backed by a thin layer of resilient material to accommodate relative thermal expansion and contraction between the liner and the male mold member plastic body.

References Cited in the file of this patent

UNITED STATES PATENTS

| | | |
|---|---|---|
| 1,357,343 | Novotny | Nov. 2, 1920 |
| 2,339,433 | Staehle | Jan. 18, 1944 |
| 2,397,231 | Barnes | Mar. 26, 1946 |
| 2,415,504 | MacDonald | Feb. 11, 1947 |
| 2,478,165 | Collins | Aug. 2, 1949 |
| 2,512,535 | Wiltshire et al. | June 20, 1950 |
| 2,599,554 | Howenstine | June 10, 1952 |